United States Patent Office 3,227,673
Patented Jan. 4, 1966

3,227,673
HIGH ACRYLONITRILE HIGH SOLIDS
CONTAINING LATICES
June T. Duke and Dorothy C. Prem, Maple Heights, and Edwin O. Hook, Chagrin Falls, Ohio, assignors to The Standard Oil Company, Cleveland, Ohio, a corporation of Ohio
No Drawing. Filed June 5, 1962, Ser. No. 200,667
1 Claim. (Cl. 260—29.7)

This invention relates to a terpolymer combined with a novel emulsifier-stabilizer, promoter, initiator system to form a latex having excellent film-forming properties. The terpolymer contains a high amount of acrylonitrile and the latex contains a high amount of solids. Films prepared from it have excellent chemical and physical properties.

It has heretofore been impossible to make a high acrylonitrile content latex with good film-forming properties, or one that contains a high amount of solids.

The components of the terpolymer of this invention are 40 to 70% acrylonitrile, 15 to 35% of a conjugated diene and 15 to 35% of a monovinyl ether.

The acrylonitrile has the formula $$CH_2=CHCN$$

The conjugated diene has the formula $$CH_2=C-C=CH_2$$
$$\quad\quad | \quad |$$
$$\quad\quad R \quad R$$

where R is hydrogen, methyl, and ethyl radicals. The conjugated diene may be butadiene-1,3; 2-methyl butadiene-1,3 (isoprene); 2,3-dimethylbutadiene-1,3; 2-diethyl butadiene-1,3; or 2,3-diethyl butadiene-1,3. The preferred materials are either butadiene-1,3, or 2-methyl-butadiene-1,3 (isoprene). The monovinyl ether has the the formula $$CH_2=CH—OR$$

where R is methyl, ethyl, propyl, isopropyl, butyl. The ethyl and butyl vinyl ethers are most readily available commercially and the latter is preferred.

When the terpolymer is made up according to the invention, the latex forms clear films with outstanding physical properties. Many polymerization formulas were studied with the terpolymer, but no other system successfully formed clear films with excellent properties. The high acrylonitrile solids latices are suitable for coatings and as vehicles for paints, sizes, etc.

The emulsifier consists of phosphate esters of polyoxyethylenated alkyl phenols, such as nonyl phenol, or of polyoxyethylenated aliphatic alcohols, such as tridecyl alcohol—which are nonionic surfactants in their own right. The emulsifier is either the mono or the diester or a mixture of the mono and diesters with the following formulae:

$$R—O—(CH_2CH_2O)_n—P\begin{matrix}\diagup\!\!\!\!O\\ \diagdown(OM)_2\end{matrix}$$

$$\begin{matrix}R—O—(CH_2CH_2O)_n\diagdown\\ \quad\quad\quad\quad\quad\quad\quad\quad P\diagup\!\!\!\!O\\ R—O—(CH_2CH_2O)_n\diagup\quad\diagdown OM\end{matrix}$$

R is alkyl, aryl, alkylaryl, aralkyl groups having 8 to 27 carbon atoms,
M is hydrogen, ammonium, potassium, or sodium, and
$n$ is the number of ethylene oxide units required for a water number of at least 18.

The emulsifier is made according to the methods disclosed in the U.S. Patents 3,004,056 and 3,004,057. In use the pH of the emulsifier-water solution is adjusted by the addition of ammonium, sodium, or potassium hydroxide. The preferred emulsifier is available under the trade name Gafac RE–610, and the amount is 1.5 to 5 parts per hundred parts of monomer.

For this invention, it was found that it is the water value number of the emulsifier that is the critical factor. The water value number is determined according to the method described in Anal. Chem. 28, p. 1693 (1956). The water value number cannot be less than 18, although the preferred number is 24. There is no critical upper limit for the water value, but it becomes impractical to go above 1000.

The stabilizer is the sodium salt of the formaldehyde condensation product of naphthalene sulfonic acid. This compound is available under the trademarks Daxad and Daxad–11. Darvan, a purified Daxad, is also suitable. The amount of stabilizer used is 0.1 to 0.5 part per hundred parts of monomer.

The promoter is a higher mercaptan and may contain from 8 to 20 carbons. n-Dodecyl mercaptan is preferred. It is used in the amount of 0.005 to 0.5 part per hundred parts of monomer.

The initiator is an oxygen-liberating material, such as benzoyl peroxide, sodium persulfate, potassium persulfate, sodium perborate, or hydrogen peroxide. The preferred initiator is potassium persulfate. The amount varies between 0.10 to 1.5 parts per hundred parts of monomer.

The polymerization can be conducted at pH levels of 3 to 9, but adjustment of the emulsifier-water-stabilizer mixture of pH 7–8 is preferred for polymerization stability.

The amount of water to monomer is based on parts by weight and is 40 to 60 parts of water to 60 to 40 of monomer. The water preferably is either distilled or deionized.

It is the emulsifier-stabilizer combination that makes possible the formation of a fluid, stable, high solids containing latex that contains a large amount of acrylonitrile. The polymerization is effected in a short time depending on the initiator-promoter system. The conversions are high. A conversion of 90% of monomer in five hours has been achieved. Untreated monomer can be removed, if desired, by vacuum stripping. Furthermore, the use of this emulsifier-stabilizer system has made possible a latex of at least 45% total solids that is completely free of coagulum. The films made from the latex are unusually clear and glossy, in addition to being tough and flexible.

Particle size may be varied by altering the initial amount of emulsifier; this, in turn, affects latex viscosity and film properties. Additional amounts of emulsifier are added while polymerization progresses to raise the total to the desired level. Polymerization rate is controlled, as well as latex viscosity, by adding additional amounts of promoter with the emulsifier. Incremental additions of emulsifier and promoter are specified in this high acrylonitrile high solids composition to achieve desirable viscosity, stability, and polymerization rate.

The following examples are set forth as preferred embodiments of the invention. They are not intended, in any way, to limit the invention.

Example I

The emulsifier is prepared by reacting nonyl phenol with ethylene oxide and phosphating the product with $P_2O_5$ to obtain a product that has a water balance number of 24. The reaction is exothermic and, in some instances, cooling is necessary to prevent the temperature from rising above 110° C. since this causes discoloration. The reaction may continue for from one-half to five hours or more at ambient temperatures up to 110°

C. until all the P₂O₅ has dissolved. Vigorous agitation helps the reaction go to completion.

The ingredients of the composition are:

|  | Parts/100 Parts Monomer, Initial Charge | Parts/100 Parts Monomer, Total Charge |
|---|---|---|
| Acrylonitrile | 45 | 45 |
| Butyl vinyl ether | 30 | 30 |
| Isoprene | 25 | 25 |
| Emulsifier (Gafac RE-610) | ª 1.5 | 2.35 |
| Stabilizer (Daxad-11) | 0.1 | 0.1 |
| Initiator (potassium persulfate) | ª 0.2 | 0.5 |
| Promoter (n-dodecyl mercaptan) | 0.04 | 0.04 |
| Water | ª 87.0 | 100.0 |

ª The rest of the emulsifier, potassium persulfate, and water were added in three substantially equal increments as follows, at 41, 50 and 65 percent conversion.

The pH of the emulsifier and water mixture was adjusted to 8.0 with ammonium hydroxide. The polymerization was carried out in a closed stainless steel pressure vessel at 50° to 70° C. At the end of 7.5 hours, the polymer conversion was 88.5, the total solids were 41% and the nitrogen analysis indicated 50.5% acrylonitrile in the polymer in the latex. The latex prepared was fluid, stable, free of coagulum, and at room temperature and below formed clear, glossy, tough, flexible films. Films may be formed as low as 9° C. These films are resistant to grease and water, and as free films have a tensile strength of at least 1000 p.s.i.

*Example II*

The emulsifier was prepared as an Example I. The composition consists of:

|  | Parts/100 Parts Monomer, Initial Charge | Parts/100 Parts Monomer, Total Charge |
|---|---|---|
| Acrylonitrile | 55 | 55 |
| Butyl vinyl ether | 25 | 25 |
| Butadiene-1,3 | 20 | 20 |
| Emulsifier (Gafac RE-610) | ª 1.5 | 2.35 |
| Stabilizer (Daxad-11) | 0.1 | 0.1 |
| Initiator (potassium persulfate) | ª 0.2 | 0.4 |
| Promoter (n-dodecyl mercaptan) | 0.04 | 0.04 |
| Water | ª 91.0 | 100.0 |

ª The rest of the emulsifier, initiator, and water were added in two increments at 65 and 84 percent conversion.

Ammonium hydroxide was used to adjust the pH of the emulsifier and water mixture to a pH of 8. The polymerization was conducted at 50° to 70° C. in a closed stainless steel reactor. The conversion was 92% at the end of 7.5 hours. The total solids was 47.0%. The amount of acrylonitrile in the polymer in the latex was 58.2% based on a nitrogen analysis. The latex was free of coagulum and stable. The films that formed at room temperature were clear, glossy, tough and flexible.

*Example III*

The emulsifier was prepared as in Example I. The composition consists of:

|  | Parts/100 Parts Monomer, Initial Charge | Parts/100 Parts Monomer, Total Charge |
|---|---|---|
| Acrylonitrile | 45 | 45 |
| Ethyl vinyl ether | 30 | 30 |
| Butadiene | 25 | 25 |
| Emulsifier (Gafac RE-610) | ª 1.5 | 2.35 |
| Stabilizer (Daxad-11) | 0.1 | 0.1 |
| Initiator (potassium persulfate) | ª 0.2 | 0.5 |
| Promoter (n-dodecyl mercaptan) | 0.04 | 0.04 |
| Water | ª 87.0 | 100.0 |

ª The rest of the emulsifier, potassium persulfate, and water were added in three substantially equal increments at 41, 50, and 65 percent conversion.

The pH of the emulsifier and water mixture was adjusted to 8.0 with ammonium hydroxide. The polymerization was carried out in a closed stainless steel pressure vessel at 50° to 70° C. At the end of 5.5 hours, the polymer conversion was 85%, the total solids were 43.4%. The latex prepared was free of coagulum, stable and fluid, and at room temperature, formed at clear, tough, flexible glossy film.

*Example IV*

The emulsifier was prepared as in Example I. The composition consists of:

|  | Parts/100 Parts Monomer, Initial Charge | Parts/100 Parts Monomer, Total Charge |
|---|---|---|
| Acrylonitrile | 45 | 45 |
| Ethyl vinyl ether | 30 | 30 |
| Butadiene | 25 | 25 |
| Emulsifier (Gafac RE-610) | ª 1.5 | 1.00 |
| Stabilizer (Daxad-11) | 0.10 | 0.10 |
| Initiator (potassium persulfate) | ª 0.10 | .30 |
| Promoter (n-dodecyl mercaptan) | 0.04 | 0.04 |
| Water | ª 87.0 | 100.0 |

ª The rest of the emulsifier, initiator, and water was added in three increments at 40, 70, and 80 percent conversion.

The pH of the emulsifier and water mixture was adjusted to 8.0±0.1 with 10% potassium hydroxide solution. Polymerization occurred in a close stainless steel pressure vessel at 50° to 70° C. Conversion was 92% at the end of 7.5 hours, total solids were 47.0%. The amount of acrylonitrile in the polymer in the latex was 58.2% based on a nitrogen analysis. The latex prepared was free of coagulum and stable. The films that formed at room temperature were clear, glossy, tough, and flexible.

*Example V*

The emulsifier was prepared as in Example I. The composition consists of:

|  | Parts/100 Parts Monomer, Initial Charge | Parts/100 Parts Monomer, Total Charge |
|---|---|---|
| Acrylonitrile | 45.0 | 45.0 |
| Butyl vinyl ether | 30.0 | 30.0 |
| Isoprene | 25.0 | 25.0 |
| Emulsifier (Gafac RE-610) | ª 1.50 | 2.35 |
| Stabilizer (Daxad-11) | 0.10 | 0.10 |
| Initiator (potassium persulfate) | ª 0.20 | 0.50 |
| Promoter (n-dodecyl mercaptan) | 0.04 | 0.04 |
| Water | ª 87.0 | 100.0 |

ª The rest of the emulsifier, initiator, and water were added in three increments at conversions of 40, 50, and 65 percent.

The pH of the emulsifier and water mixture was adjusted to 8.0±0.1 with 10% sodium hydroxide solution. Polymerization was carried out in a closed stainless steel pressure vessel at 50° to 70° C. At the end of 7.5 hours, the polymer conversion, the total solids, and the amount of acrylonitrile in the polymer in the latex based on a nitrogen analysis, were approximately the same in Example I. The latex that was prepared was fluid, stable, free of coagulum, and at room temperature and below formed clear, glossy, tough, flexible films.

We claim:

A stable high solids latex consisting essentially of
(a) 40 to 60 parts by weight of water;
(b) 40 to 60 parts by weight of polymerized monomers consisting essentially of
 (1) 40 to 70% acrylonitrile,
 (2) 15 to 35% of a conjugated diene having the formula

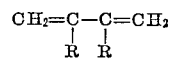

where R is selected from the group consisting of hydrogen, methyl and ethyl radicals,
(3) 15 to 35% of a monovinyl ether of the general formula

where R is selected from the group consisting of methyl, ethyl, propyl, isopropyl, butyl radicals, and based on 100 parts of the monomers;

(c) as an emulsifier 1.5 to 5 parts of a compound selected from the group consisting of

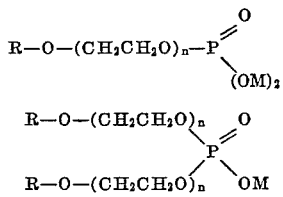

$$R-O-(CH_2CH_2O)_n-P{\overset{O}{\underset{(OM)_2}{\diagup}}}$$

$$\underset{R-O-(CH_2CH_2O)_n}{\overset{R-O-(CH_2CH_2O)_n}{>}}P{\overset{O}{\underset{OM}{\diagup}}}$$

and mixtures thereof, in which R is selected from the group consisting of alkyl, aryl, alkaryl, aralkyl having 8 to 27 carbon atoms, M is selected from the group consisting of hydrogen, ammonium, potassium and sodium, and $n$ is the number of ethylene units required for a water number of at least 18;

(d) as a stabilizer 0.1 to 0.5 part of a sodium salt of the formaldehyde condensation product of naphthalene sulfonic acid;

(e) as an initiator 0.10 to 1.5 parts of an oxygen-liberating compound selected from the group consisting of benzoyl peroxide, sodium persulfate, potassium persulfate, sodium perborate and hydrogen peroxide; and (f) as a promoter 0.005 to 0.5 part of n-dodecyl mercaptan.

References Cited by the Examiner

UNITED STATES PATENTS

| | | | |
|---|---|---|---|
| 2,589,919 | 3/1952 | Arundale et al. | 260—29.7 |
| 2,853,471 | 9/1958 | Beadell | 260—82.3 |
| 2,868,754 | 1/1959 | Eilbeck et al. | 260—29.7 |
| 2,941,971 | 6/1960 | Thompson et al. | 260—29.7 |

MURRAY TILLMAN, *Primary Examiner.*

LOUISE P. QUAST, *Examiner.*